United States Patent [19]

Tokizaki et al.

[11] Patent Number: 4,495,450
[45] Date of Patent: Jan. 22, 1985

[54] CONTROL DEVICE FOR BRUSHLESS MOTOR

[75] Inventors: Hisashi Tokizaki; Hironobu Sato, both of Gunma, Japan

[73] Assignees: Sanyo Electric Co., Ltd.; Tokyo Sanyo Electric Co., Ltd., both of Japan

[21] Appl. No.: 562,434

[22] Filed: Dec. 16, 1983

[30] Foreign Application Priority Data

| Dec. 29, 1982 [JP] | Japan | 57-232761 |
| Jan. 26, 1983 [JP] | Japan | 58-11733 |
| Mar. 23, 1983 [JP] | Japan | 58-42565[U] |
| Apr. 13, 1983 [JP] | Japan | 58-66091 |
| Aug. 2, 1983 [JP] | Japan | 58-142195 |

[51] Int. Cl.$^3$ .......................................... H02K 29/02
[52] U.S. Cl. ..................... 318/138; 318/254; 318/439
[58] Field of Search ................ 318/138, 254 A, 254, 318/439

[56] References Cited

U.S. PATENT DOCUMENTS

| 4,262,236 | 4/1981 | Gelenius et al. | 318/254 X |
| 4,270,074 | 5/1981 | Duckworth et al. | 318/138 X |
| 4,446,406 | 5/1984 | Uzuka | 318/138 X |

FOREIGN PATENT DOCUMENTS

| 0029917 | 3/1977 | Japan | 318/254 |
| 0026913 | 3/1978 | Japan | 318/254 |
| 0046680 | 4/1981 | Japan | 318/254 |
| 0160386 | 10/1982 | Japan | 318/254 |
| 0180382 | 11/1982 | Japan | 318/254 |

*Primary Examiner*—J. V. Truhe
*Assistant Examiner*—Bentsu Ro
*Attorney, Agent, or Firm*—Darby & Darby

[57] ABSTRACT

A control device for brushless motor comprises an inverter (3), a control circuit (8) and a rotor position detecting circuit (9). In the rotor position detecting circuit (9), voltage induced in stator coils (U, V and W) due to rotation of a rotor (7) and neutral voltage at a virtual neutral point (25) are compared by comparators (CU, CV and CW) so that polarity changing points can be detected. The control circuit (8) controls the inverter (3) based on the above stated polarity changing points so as to control changeover of the modes for conducting to the stator coils (U, V and W). As a result, rotation of a brushless motor can be controlled without using Hall elements.

8 Claims, 26 Drawing Figures

CONTROL DEVICE FOR BRUSHLESS MOTOR

BACKGROUND OF THE INVENTION

1. Field of the Invention

The present invention relates to a control device for brushless motor and particularly to a control device capable of controlling rotation of a brushless motor without using rotor position detecting elements such as Hall elements.

2. Description of the Prior Art

Briefly stated, a brushless motor is a motor in which the position of magnetic poles of a rotor are detected by means of a detector directly coupled to the shaft of a rotor and in response to the detected positions, semiconductor switching elements such as transistors, thyristors and the like are turned on and off so as to continuously generate torque in the rotor. For the rotor, field winding or a permanent magnet is used.

FIG. 1 shows a conventional control device for a brushless motor. A brushless motor includes a stator 4 and a rotor 7. The stator 4 includes three-phase stator coils U, V, and W and rotor position detecting elements, for example, Hall elements $H_1$, $H_2$ and $H_3$. The rotor 7 includes a permanent magnet having the surface on which magnetic poles N and S are formed. A control device comprises a single-phase AC power source 1, a rectifier circuit 2, a control circuit 5, an inverter 3 and a rotor position detector 6. The rectifier circuit 2 has for example a well-known thyristor bridge circuit and rectifies the alternating current power from the AC power source 1 so as to supply direct current power. The inverter 3 operates responsive to a control signal applied thereto to supply direct current power to the stator coils U, V, and W in predetermined modes so that a rotational magnetic field is generated in the stator 4. The inverter 3 includes, as switching elements, six transistors $Q_1$ to $Q_6$ connected in a three-phase bridge fashion. The switching elements are not limited to the transistors, and thyristors or other switching elements may be used. The rotor position detector 6 detects the rotation positions of the rotor 7 based on the signals from the Hall elements $H_1$ to $H_3$. The control circuit 5 controls conduction of the transistors $Q_1$ to $Q_6$ in the inverter 3 in a predetermined order in response to the signals from the rotor position detector 6.

The operation of such a control device for brushless motor will be described in more detail with reference to FIG. 2. FIG. 2 shows a timing chart in a control device for brushless motor. FIG. 2A shows the mode number and the rotation angle of a rotor. FIG. 2B shows the ON-OFF states of the transistors in an inverter. FIG. 2C shows a relation between voltage applied to the stator coils and voltage induced in the stator coils. The control circuit 5 controls the transistors $Q_1$ to $Q_6$ in the inverter 3 as shown in FIG. 2B in response to the signals, obtained from the rotation position detector 6, indicating the rotation positions of the rotor 7. More specifically, in the mode 1, the transistors $Q_1$ and $Q_5$ are turned on and the other transistors are turned off. As a result, electric current as shown by the arrow I in FIG. 1 flows between the stator coils U and V. In the mode 2, the transistors $Q_1$ and $Q_6$ are turned on and the other transistors are turned off. As a result, electric current as shown by the arrow II in FIG. 1 flows between the stator coils U and W. In the mode 3, the transistors $Q_2$ and $Q_6$ are turned on and the other transistors are turned off, whereby electric current as shown by the arrow III in FIG. 1 flows between the stator coils V and W. Subsequently in the same manner, in the modes 4 to 6, the transistors $Q_1$ to $Q_6$ are successively controlled as shown in FIG. 2B. Thus, a cycle of the modes 1 to 6 as described above is repeated.

In the following, description will be made of voltage applied to the stator coils U, V and W in each of the modes as described above. Referring to FIG. 2C, rectangular waveforms represent voltages applied to the stator coils U, V and W. In case where voltage on the positive side (the upper side from the central line in the drawing) is applied to the stator coils, electric current flows from the terminals of the stator coils on the power source side toward the neutral point N, and in case where voltage on the negative side (the lower side from the central line in the drawing) is applied to the stator coils, electric current flows from the neutral point N toward the terminals of the stator coils on the power source side.

When electric current flows in the stator coils U, V and W as described above, a rotational magnetic field is formed in the stator 4. Accordingly, a certain point M, for example, in the rotor 7 rotates from the point P to the points Q, R, X, Y and Z in FIG. 1 corresponding to the respective modes. Subsequently, corresponding to the modes successively repeated, the rotor 7 rotates, so that the motor can continue operation.

However, in a conventional brushless motor, Hall elements $H_1$ to $H_3$ are provided in three points in the stator 4 so as to detect the rotation positions of the rotor 7 and based on the detected positions, the control circuit 5 controls conduction, namely supply of current, to the stator coils, U, V and W. In such case, since the positions of the Hall elements are fixed, the angle of a brush as in a direct-current motor cannot be changed and therefore, it is difficult to make operation according to various load conditions in which a motor is to be used. In addition, the characteristics of a motor largely depend on the fixing positions of the Hall elements and accordingly, the fixing precision of the Hall elements becomes of great importance, which requires a high precision in manufacturing and assembling of the parts of a motor or in structure thereof. Furthermore, there are disadvantages that since heat resisting temperature of a Hall element is approximately 100° C. or less, deterioration of the characteristics of the motor might be caused at the time of overload and consequently a limitation might be imposed on the operating conditions of the motor or troubles would be easily caused in the motor.

On the other hand, each Hall element needs four lead wires in all, that is, two lead wires for power source and the other two wires for output. Accordingly, in order to control a three-phase motor, 12 lead wires in all are needed for Hall elements $H_1$ to $H_3$ and in addition, three lead wires are needed for stator coils U, V, and W, which causes inevitably complication in the terminals for connection of a motor and lead wires, complicated positioning of the Hall elements in a stator, intricate control of precision in fixing the Hall elements to the stator or intricate control of connection of the lead wires between the respective elements and the control circuit. Furthermore, the Hall elements per se should be protected from oil, humidity and other environmental conditions in a place where the motor is installed, which necessarily imposes limitation on the application range of the motor.

Since conventional rotor position detecting elements such as Hall elements are fixed in positions determined in advance according to the application of the motor, for example, according to the driving speed of a load, the magnitude of the load and the like, there is a disadvantage that operation of high efficiency can not be performed in case where the motor is applied to the load or the rotational speed etc. different from the initially determined conditions.

In some motors, a method of controlling the operation utilizing voltage induced in stator coils is adopted conventionally. However, in such a conventional control method using induced voltage, macroscopic control is made by simply comparing the voltage induced in proportion to the number of revolutions with the reference voltage and accordingly, control of the rotation of a motor can not be made finely. In addition, since control of the conduction to the stator coils corresponding to the rotation positions of a rotor is not made, the operation of the motor is far from the optimum operation. Accordingly, in a conventional motor of this type, design had to be made by taking account of an allowance for driving power, which made it difficult to design the motor of a small and thin size.

As one method for dissolving the above described disadvantages, the Japanese Patent Publication Gazette No. 25038/1983 published on May 25, 1983 discloses a rotor position detecting circuit for brushless motor, in which, based on three comparison signals with phases deviating from each other by 120°, obtained by comparing the neutral voltage of the armature winding with respect to the negative power source side with the nonneutral three terminal voltages of the armature winding, group of switching elements of a semiconductor commutator apparatus is controlled so as to rotate a rotor including a magnet. However, this circuit needs a Miller integrator for obtaining control signals. Accordingly, it is needed to select an appropriate value for an integral constant of the Miller integrator (this is pointed out in the above stated gazette), and if the number of revolutions of the motor is out of the permissible range of the integral constant, control becomes impossible. In addition, because of a lag in control in the Miller integrator, step-out is caused by a rapid change in the load. Furthermore, since an accurate control signal cannot be obtained in the state where the motor starts to operate, other suitable means is needed for the start of operation (this is also pointed out in the above stated gazette). As one of such means, a cage conductor is provided in the rotor besides the magnet.

Therefore, a control device for brushless motor of other type not having such disadvantages has been desired.

SUMMARY OF THE INVENTION

The present invention is, briefly stated, a control device for controlling conduction to stator coils in a brushless motor having stator coils of a plurality of phases and a rotor having a permanent magnet of a plurality of poles, comprising: power source means for supplying direct current power; inverter means responsive to a control signal applied thereto for supplying the direct current power to the stator coils in a plurality of predetermined modes to be changed over so as to generate a rotational magnetic field in the stator; reference voltage providing means for providing reference voltage having a predetermined relation with the voltage of the power source means; comparing means for comparing voltage induced in the stator coils due to rotation of the rotor with the reference voltage so as to provide a comparison signal; and mode controlling means for supplying the control signal corresponding to the predetermined modes for the inverter means, the mode controlling means including first timer means responsive to changeover of the mode to be enabled and responsive to change in the comparison signal to be disabled for determining a first period of time and second timer means responsive to disablement of the first timer means to be enabled for changing over the modes at the end of a second period of time having a predetermined relation with the first period of time.

According to the present invention, voltage induced in the stator coils due to rotation of the rotor and reference voltage are compared by comparing means so that a comparison signal is generated. A changing point of the comparison signal corresponds to a rotation position of the rotor. The mode controlling means changes over a mode for conducting the stator coils in response to a mode changeover signal applied thereto. On the other hand, the first timer means measures the first period of time in response to changes in the modes and in the comparison signal. The second timer means measures the second period of time shorter than the first period of time in response to stop of measurement in the first timer means. The time-up in the second timer means causes the mode selecting signal to be generated, so that changeover of the mode is made. Thus, according to the present invention, it was ascertained that the rotation positions of the rotor can be detected without using Hall elements, whereby control of the rotation of the brushless motor can be made.

Therefore, a principal object of the present invention is to provide a control device for brushless motor capable of performing operation stably with high efficiency without using rotor position detecting elements such as Hall elements.

A principal advantage of the present invention is that operation of a motor can be made stably with high efficiency without using rotor position detecting elements such as Hall elements.

Another advantage of the present invention is that since Hall elements fixed in determined positions of a motor are not needed, adjustment can be made easily according to the changes in the load conditions of a motor in the purposes for which the motor is applied and accordingly operation of the motor can be performed with high efficiency.

A further advantage of the present invention is that since Hall elements are not needed, use of lead wires, terminals etc. for the Hall elements becomes unnecessary and accordingly, the structure of the apparatus and assembling operation and the like can be simplified.

Still a further advantage of the present invention is that since Hall elements are not needed, it is not required to make limitation on the application range of a motor for the purpose of protecting the Hall elements from environmental conditions.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 2A shows mode numbers and the rotation angle of a rotor; FIG. 2B shows the ON-OFF states of the transistors in an inverter; FIG. 2C shows a relation between voltage applied to stator coils and voltage induced in the stator coils; FIG. 2D shows a relation between voltage induced in the stator coils and output of comparators; and FIG. 2E shows timing at polarity changing points;

FIG. 4 shows a time chart at the time of changeover of the modes.

FIG. 10A shows mode numbers; FIG. 10B shows input of a comparator; FIG. 10C shows output of the comparator; and FIG. 10D shows timing at polarity changing points;

DESCRIPTION OF THE PREFERRED EMBODIMENTS

Figure 1:
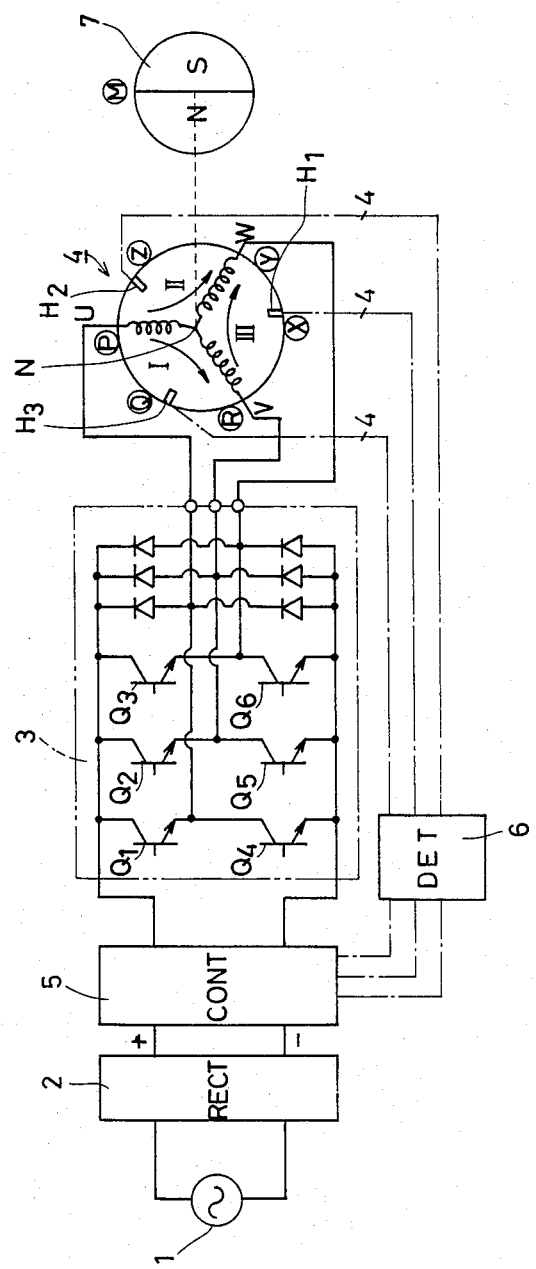
FIG. 1 shows a conventional control device for a brushless motor.
Figure 3:
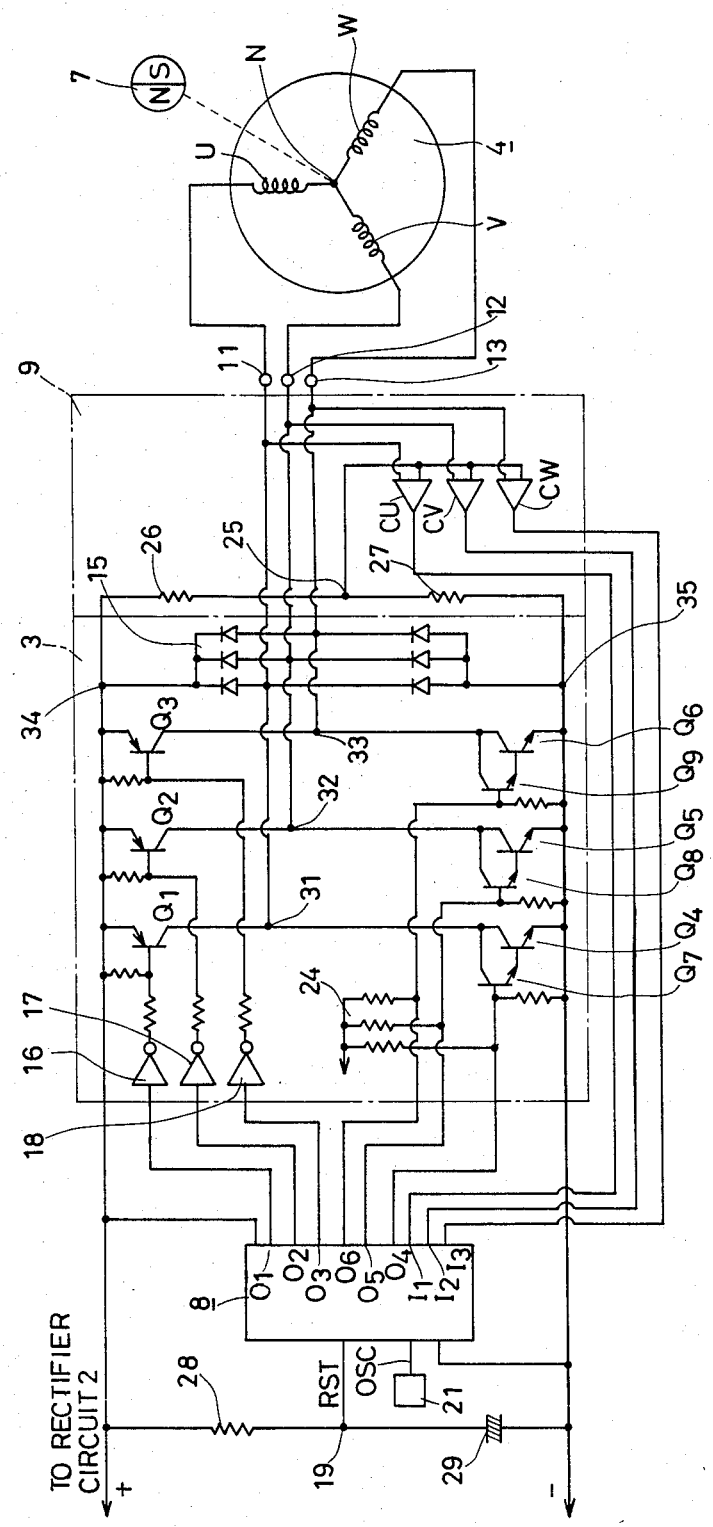
FIG. 3 is a circuit diagram showing an embodiment of the present invention.

FIG. 3 is a circuit diagram showing an embodiment of the present invention. The following description will be made mainly in connection with different points compared with the circuit shown in FIG. 1. An inverter 3 is connected to a rectifier circuit 2 similar to that in FIG. 1, so that direct current power is supplied therefrom. A control circuit 8 comprises a microcomputer as will be described below in detail. Between a plus (+) terminal and a minus (−) terminal of the rectifier circuit 2, a resistor 28 and a capacitor 29 are connected in series with each other and from the connection point 19 therebetween, a reset signal RST is supplied to the control circuit 8 at the time of turning on the power source. The control circuit 8 is further connected with a clock generator 21, from which an oscillation signal OSC is inputted. The control circuit 8 has output ports $O_1$ to $O_6$ and input ports $I_1$ to $I_3$. The output ports $O_1$ to $O_3$ are connected to transistors $Q_1$ to $Q_3$ through inverting amplifiers 16 to 18, respectively, and the output ports $O_4$ to $O_6$ are connected to transistors $Q_7$ to $Q_9$, respectively. The transistors $Q_7$ to $Q_9$ and transistors $Q_4$ to $Q_6$ form Darlington connection, respectively. The transistors $Q_7$ to $Q_9$ are connected with a power source input 24 for supplying base bias. The transistors $Q_1$ to $Q_6$ are turned on in response to high level signals from the output ports $O_1$ to $O_6$. These transistors $Q_1$ to $Q_6$ constitute a well-known three-phase bridge circuit. For the transistors $Q_1$ to $Q_6$, a circuit 15 is provided for the purpose of protecting them from spike voltage caused at the time of switching for conduction to the stator coils, U, V and W. The connection points 31 to 33 are connected respectively to the stator coils U, V and W through terminals 11 to 13. In a motor using a control apparatus in accordance with the present invention, it is not needed to provide Hall elements for detecting the position of a rotor. Instead, a rotor position detecting circuit 9 is provided. The rotor position detecting circuit 9 comprises voltage dividing resistors 26 and 27 and comparators CU, CV and CW. The voltage dividing resistors 26 and 27 are connected in series with each other and connected to the connection points 34 and 35, that is, the plus (+) terminal and the minus (−) terminal of the rectifier circuit 2. The connection point 25 between the resistors 26 and 27 serves as a virtual neutral point so as to provide neutral voltage for one input portion of each of the comparators CU, CV and CW. The other input portions of the comparators CU, CV and CW are connected respectively to the terminals 11 to 13. The output portions of the comparators CU, CV and CW are connected respectively to the input ports $I_1$ to $I_3$ of the control circuit 8.

As is seen from FIG. 3, this embodiment does not need any Hall elements. Instead, the position of the rotor is detected by utilizing voltage induced in the stator coils U, V and W due to the rotation of the rotor. Such induced voltage will be described in the following. In a motor where a magnetic rotor rotates, induced voltage is generated in the stator coils. The induced voltage cannot be detected easily when the stator coils are conducted. However, if conduction to the stator coils is controlled so that stator coils not conducted may exist in each of the modes, induced voltage in a particular direction corresponding to the rotation position of the rotor appears between the above described virtual neutral point 25 and the stator coils not conducted. The curves in sinusoidal waveforms in FIG. 2C typically show the induced voltage between the stator coils U, V and W and the virtual neutral point 25. The rectangular waveforms represent voltage applied to the stator coils U, V and W, as described above. A relation between the induced voltage and the applied voltage is in a state as shown in the drawing when the motor is in the state of normal or steady operation. At the time of starting the operation of the motor or increasing the load of the motor, rotation of the rotor is made with a delay after application of voltage to the stator coils and therefore, the induced voltage appears with a delay after application of the voltage. More specifically, the induced voltage shown in the drawing moves to the right, changing the width of the horizontal axis.

Figure 2:
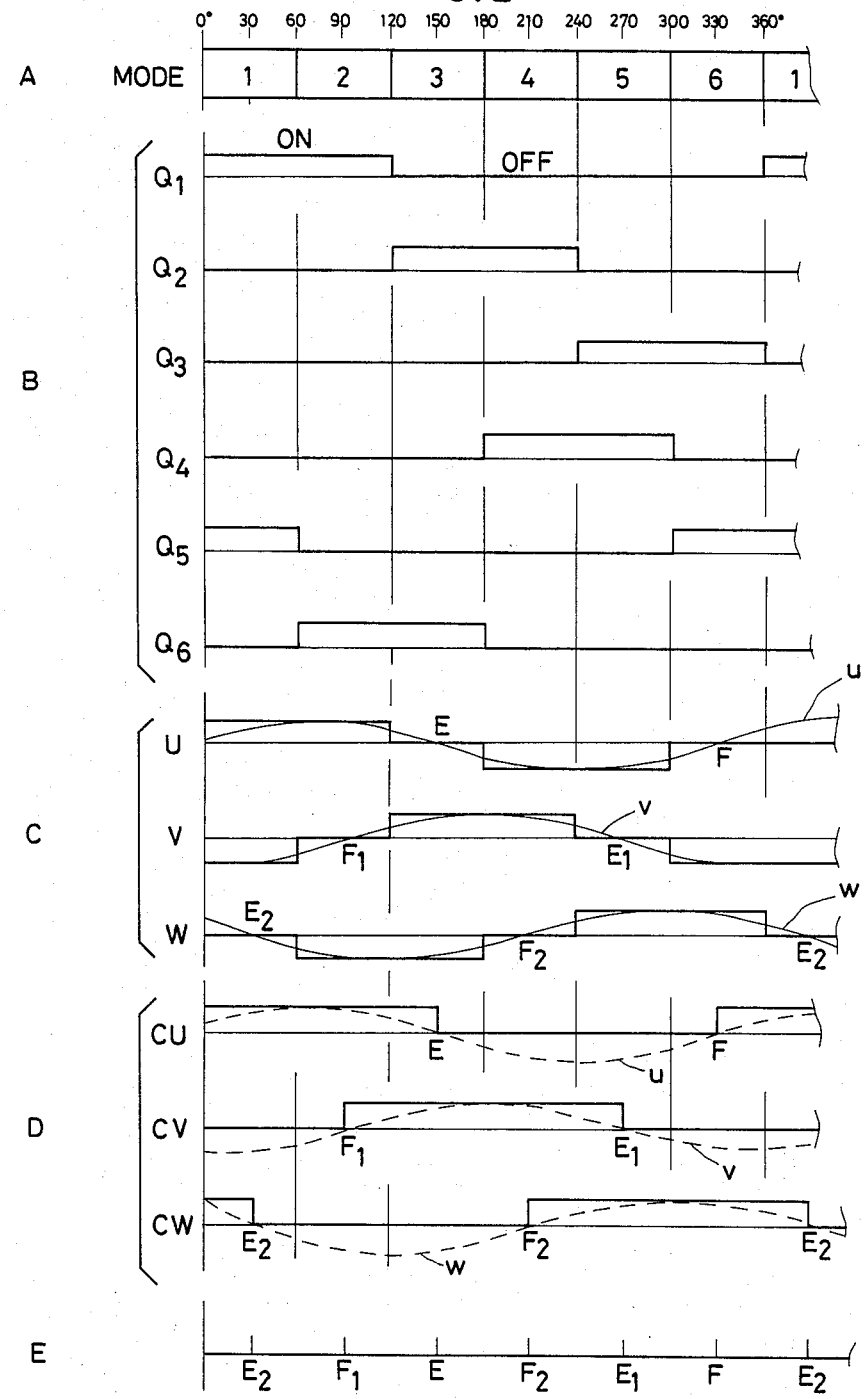
FIG. 2 shows a timing chart in a control device for the brushless motor.

A more detailed description will be made by taking the phase U as an example. At a middle point between the end point of the mode 2 and the starting point of the mode 4, that is, at a middle point E in the mode 3 (near 150° on the scale in the drawing) where the phase U is not conducted, the direction of induced voltage is reversed. In the same manner, the direction of induced voltage is also reversed at a middle point F in the mode 6 (near 330° on the scale in the drawing). Such points E and F are referred to hereinafter in the present specification as polarity changing points. The polarity changing points E and F move gradually to the right in the drawing as the load applied to the rotor 7 becomes heavy and reversely, as the load becomes light, the points E and F move to the left in the drawing. This is because the phase in the rotation position of the rotor with respect to the voltage applied to the stator coils is delayed or advanced. Similarly, in the stator coils of the phase V disposed in the stator 4 with a lag of 120° from the phase U, polarity changing points $E_1$ and $F_1$ appear. Also, in the stator coils of the phase W disposed in the stator 4 with a lag of 240° from the phase U, polarity changing points $E_2$ and $F_2$ appear. Thus, since a certain relation exists between the rotation position of the rotor and the voltage induced in the stator coils by the rotation of the rotor, in other words, since a certain relation exists between the rotation position of the rotor and the polarity changing points, the rotation position of the rotor can be detected without using rotor position detecting elements such as Hall elements, if the polarity changing points are detected by suitable detecting means. In this embodiment, the polarity changing points are detected by the comparators CU, CV and CW, as shown in FIG. 3. More specifically stated, the comparators CU, CV and CW respectively compare the voltage appearing at the virtual neutral point 25 with the induced voltage appearing in the stator cells U, V and W and provide outputs shown in rectangular waveforms in FIG. 2D. In FIG. 2D, the curves in sinusoidal waveforms represent the induced voltage as in the case of FIG. 2C. Considering the phase U for example, the polarity changing point E represents a descending portion (trailing edge) of the output of the comparator CU and the polarity changing point F represents a rising portion (leading edge) thereof. It is the same with the phases V and W. Accordingly, the polarity changing points are applied to the control circuit 8 with timing as shown in FIG. 2E.

Figure 4A:
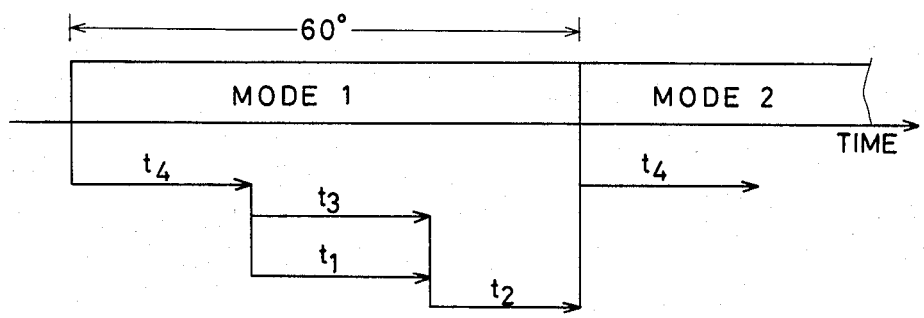
FIG. 4A shows a time chart at the time of starting operation.
Figure 4B:
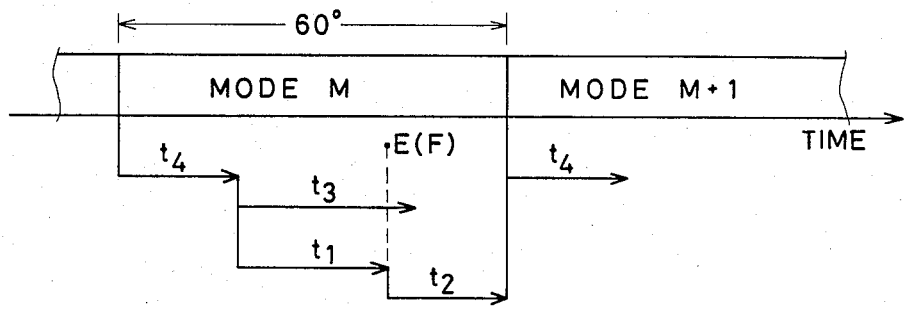
FIG. 4B shows a time chart in an intermediate state between the start of operation and normal or steady operation.
Figure 4C:
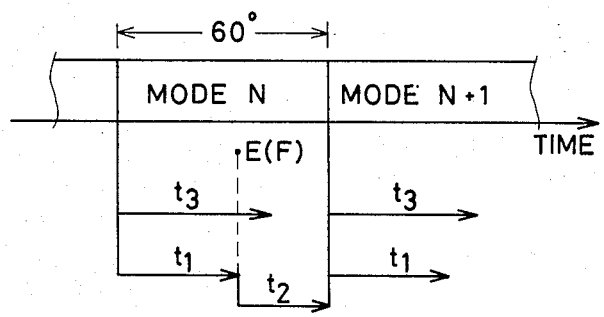
FIG. 4C shows a time chart at the time of the normal or steady operation.

Now, description will be made of a method of controlling the rotation of the motor by controlling timing for conduction to the stator coils based on the detection of such polarity changing points E and F, in other words, by controlling a changeover of the modes. First, time charts at the time of changing over the modes in this embodiment will be briefly described. A control method for applying the time charts will be described afterwards. FIG. 4A shows a time chart at the time of starting operation; and FIG. 4B shows a time chart in an intermediate state between the start of operation and the normal or steady operation; and FIG. 4C shows a time chart at the time of normal or steady operation. Referring first to FIG. 4C, in the normal operation, measurement of periods of time $t_1$ and $t_3$ starts in response to a changeover of modes, and when the above described polarity changing points E, F etc. are detected, measurement of the period of time $t_1$ stops. In response to the stop, measurement of a period of time $t_2$ starts. Between the periods of time $t_1$ and $t_2$, a relation of $t_2 = Kt_1$ where $0 < K \leq 1$ is established in advance according to the application of the motor. In response to the time-up of the period of time $t_2$, the mode changeover is made. More particularly, a mode $N+1$ is selected in place of a mode N. The same operation as described above is made in the mode $N+1$. The period of time $t_3$ serves for the case where the polarity changing points E, F etc. are not detected, the description thereof being made in the following. The value 60° shown on the mode number represents the rotation by 60° of the rotational magnetic field generated in the stator coils. Next, referring to FIG. 4A, at the time of starting operation of the motor, measurement of the period of time $t_4$ starts in response to the changeover of the modes, for example, in response to the start of a mode 1, and in response to the time-up of the period of time $t_4$, measurement of the periods of time $t_1$ and $t_3$ starts. At the time of starting operation, there is a case where it is difficult to detect the polarity changing points E, F, etc. because the voltage induced in the stator coils is of a small value. In such a case, time-up of the predetermined period of time $t_3$ is made and in response thereto, measurement of the period of time $t_1$ stops and measurement of the period of time $t_2$ starts. In response to the time-up of the period of time $t_2$, the mode changeover is made and subsequently, the same operation is performed. The period of time $t_4$ is given for the purpose of rotating the magnetic field slowly by changing over the modes slowly according to the slow rotation of the rotor at the time of starting operation. Between the rotational speed N of the rotor in this state and the periods of time $t_1$, $t_2$ and $t_4$, the following relation exists.

$$N = 60/6(t_1 + t_2 + t_4)$$

The period of time $t_4$ is gradually made smaller as the changeover of the modes proceeds and it becomes 0 at the time of normal operation. Furthermore, referring to FIG. 4B, in an intermediate state, the period of time $t_4$ is of a small value and measurement of the period of time $t_1$ starts in response to the detection of the polarity changing points E, F etc. Except for the above described points, the same operation as in the case of FIG. 4A or FIG. 4C is performed.

Figure 5:
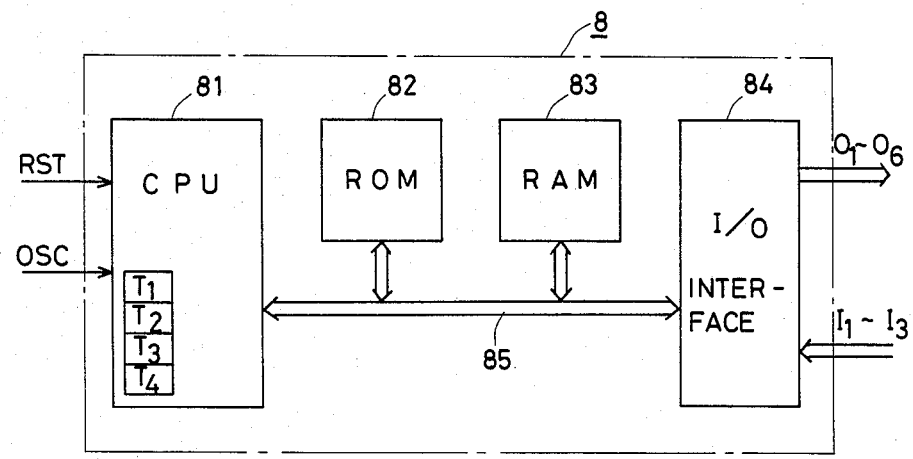
FIG. 5 is a block diagram showing in detail a control circuit.

Now, a detailed description will be made of the control circuit 8 for making control as in the above described time charts. FIG. 5 is a block diagram showing in detail the control circuit 8. The control circuit 8 comprises a central processing unit (CPU) 81, a read-only memory (ROM) 82, a random-access memory (RAM) 83, an input/output (I/O) interface 84 and a bus 85 for connecting these devices with each other. To the CPU 81, the above described reset signal RST and oscillation signal OSC are supplied. The control circuit 8 has timer $T_1$ to $T_4$, which are structured by software, for example. The timer $T_1$ to $T_4$ serve respectively to measure the above described periods of time $t_1$ to $t_4$. The ROM 82 contains a program and the like for turning on and off the transistors $Q_1$ to $Q_6$ in the inverter 3 according to the respective modes. In the RAM 83, necessary data for control, for example, the above described periods of time $t_1$ to $t_4$ are stored. The I/O interface 84 has output ports $O_1$ to $O_6$ and input ports $I_1$ to $I_3$.

Figure 6:
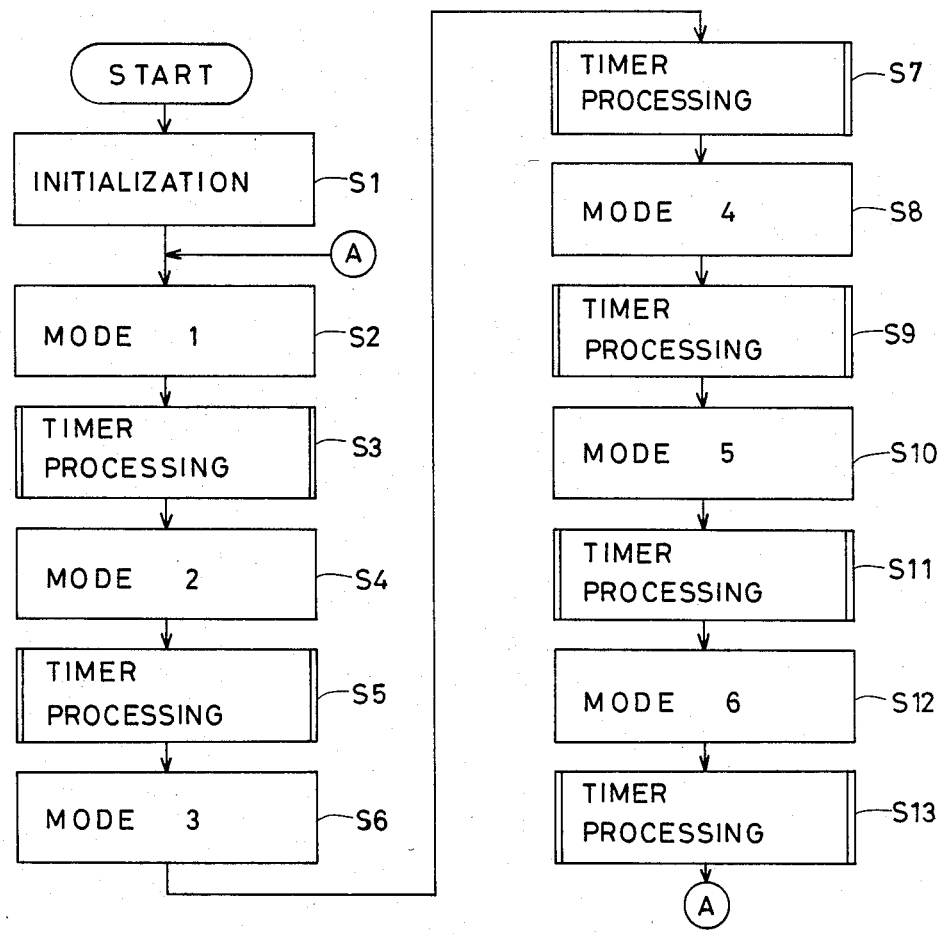
FIG. 6 is a flow chart for explaining the operation of the control circuit.
Figure 7:
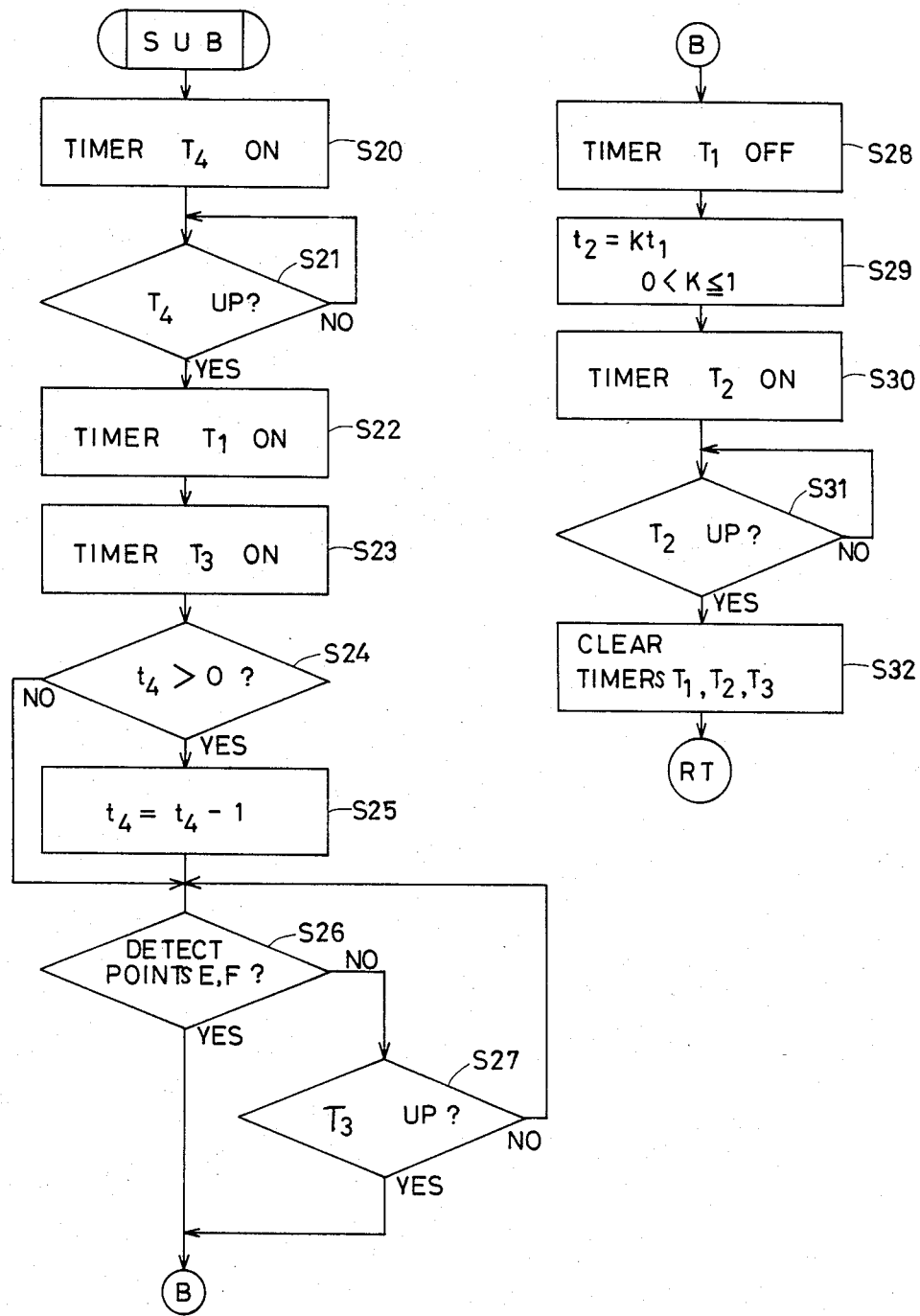
FIG. 7 is a flow chart for explaining the timer processing operation in FIG. 6.

Next, a total operation in the embodiment shown in FIG. 3 will be described referring mainly to FIGS. 6 and 7. FIG. 6 is a flow chart for explaining the operation of the control circuit 8 and FIG. 7 is a flow chart for explaining the timer processing operation in FIG. 6. First, referring to FIG. 6, when the power source is turned on to supply electric power to the FIG. 3 device, and the reset signal RST is applied to the control circuit 8, and in the step S1, initialization is made. More specifically, the timer $T_1$ to $T_3$ are cleared and in the timer $T_4$, a predetermined value, for example a hexadecimal number 0FH is set. In the step S2, processing in the mode 1 is made. More specifically, signals of high level are provided from the output ports $O_1$ and $O_5$ of the control circuit 8, whereby the transistors $Q_1$ and $Q_5$ are turned on (see FIG. 2B) and electric current flows from the stator coil U to the stator coil V (see the arrow I in FIG. 1). At the same time, in the step S3, timer processing operation is made. More specifically, referring to FIG. 7, the timer $T_4$ is enabled in the step S20 so as to start measuring and in the step S21, it is determined whether the time is up or not in the timer $T_4$. In other words, it is determined whether the period of time $t_4$=0FH in the content of the timer $T_4$ has passed or not. When the time is up in the timer $T_4$, the timer $T_1$ is enabled in the step S22 and the timer $T_3$ is enabled in the step S23. Subsequently, in the step S24, it is determined whether the period of time $t_4$ set in the timer $T_4$ is larger than 0 or not. If the period of time $t_4$ is larger than 0, the program proceeds to the step S25. If the period of time $t_4$ is 0, the program proceeds to the step S26. In the latter case, the period of time $t_4$ is a hexadecimal number 0FH and therefore, the program proceeds to the step S25, where 01H is subtracted from the period of time $t_4$ and the result obtained by the subtraction is made to be a new period of time $t_4$. Accordingly, the new period of time $t_4$ is a hexadecimal number 0EH. The subtraction of 01H from the period of time $t_4$ set in the timer $T_4$ is made for the purpose of gradually decreasing the period of time $t_4$ according to the advancement of the modes so that the period of time $t_4$ becomes 0 when the rotation of the rotor of the motor is made at the normal or steady rotational speed. More specifically, after starting of the motor, the conduction time in each mode is made to be long by interposing the period of time $t_4$ till the rotation is made at the normal rotational speed, so that the rotational magnetic field generated in the stator 4 rotates slowly to enable the rotor 7 to start rotation with a sufficient rotational torque, while after the rotational speed of the rotor attains the normal speed, the rotation of the rotor is controlled with the periods of time $t_1$ and $t_2$ to be described below, by making the period of time $t_4$ be 0. Subsequently, in the step S26, in response to a descent of the signal from the comparator CW, the polarity changing point $E_2$ is detected. Then, the program proceeds to the step S28. If the point $E_2$ is not detected, the program proceeds to the step S27. Immediately after the starting of the motor, there might be a case where the polarity changing points can not be detected because the above described induced voltage is normally of a small value at that time. In such a case, it is determined in the step S27 whether the time is up or not in the timer $T_3$. The timer $T_3$ is assumed to attain time-up with a predetermined value, for example, with a hexadecimal number 0FH. Subsequently in the steo S28, in response to either the detection of the polarity changing point $E_2$ or the time-up of the timer $T_3$ which comes earlier, the timer $T_1$ is disabled so as to stop measuring. By thus providing the timer $T_3$, timer processing operation proceeds without fail even if the polarity changing points are not detected because of a small amount of induced voltage at the time of starting the motor. In the step S29, based on the period of time $t_1$ measured by the timer $T_1$, the period of time $t_2$ is set in the timer $T_2$ with the following relation.

$$t_2 = Kt_1$$

where $0 < K \leq 1$, K being for example 0.4 to 0.5. This K corresponds to the application of a leading angle to a brush in the case of a DC motor. More specifically, K is determined in advance to a fixed value according to the purpose for which the motor is used. However, since the value K can be easily changed only by modifying the program the value K can easily follow the change in the purposes for which the motor is utilized. In the step S30, the timer $T_2$ is enabled and in the step S31, it is determined whether the time is up or not in the timer $T_2$. If the time is up, the program proceeds to the step S32. In the step S32, the contents of the timers $T_1$ to $T_3$ are cleared and then, the program returns to the steps shown in FIG. 6. If, in the mode 1, the direction of the magnetic field of the rotor 7 in the stop position before starting of the motor happens to coincide with the direction of the magnetic field formed by the stator coils, the rotor 7 does not rotate. However, it goes without saying that even in such case, the timer $T_1$ starts measuring in response to the time-up of the timer $T_4$.

Returning to FIG. 6, in the step S4, the mode 2 is selected in place of the mode 1 in response to the time-up of the timer $T_2$, so that the operation in the mode 2 is performed. More specifically, the signal of high level is continuously applied from the output port $O_1$ of the control circuit 8, while the signal from the output port $O_5$ is made to be a low level and instead, the signal from the output port $O_6$ is made to be a high level. As a result, the transistors $Q_1$ and $Q_6$ are turned on in the mode 2 (see FIG. 2B). Accordingly, electric current flows in the stator coils in the direction of the arrow II in FIG. 1. Simultaneously with the start of the mode 2, in the step S5, the same timer processing operation as in the step S3 is performed. For the details, see FIG. 7. Needless to say, in the timer processing operation in the step S5, 01H is further subtracted from the period of time $t_4$ to be set in the timer $t_4$ in the step S25. In the step S26, the polarity changing point $F_1$ is detected in response to a rise of the signal from the comparator CV. If the induced voltage at this time is of a suitable amount, the polarity changing point $F_1$ is detected. The rotor 7 which could not rotate incidentally in the mode 1 never fails to start rotation since the magnetic field formed by the stator is rotated by 60° in the mode 2.

The operations in the steps S6 to S13 are almost the same as described above, detailed description thereof being omitted. In the timer processing operation in the step S7, the polarity changing point E is detected in response to a descent of the signal from the comparator CU; in the step S9, the polarity changing point $F_2$ is detected in response to a rise of the signal from the comparator CW; in the step S11, the polarity changing point $E_1$ is detected in response to a descent of the signal from the comparator CV; and in the step S13, the polarity changing point F is detected in response to a rise of the signal from the comparator CU. A circulation of the program from the step S2 to the step S13 causes one rotation of the rotational magnetic field formed in the stator, whereby one rotation of the rotor 7 is made. In the meantime, each stator coil is conducted with a cycle of conduction by 120° and stop by 60° and as a result, operation of the motor with little third harmonics can be realized.

Summarizing the above described operations with reference to FIGS. 4A to 4C, at the time of starting the motor, the changeover of the modes is made slowly because of the long period of time $t_4$ and accordingly the rotational speed of the rotor 7 is also slow (see FIG. 4A). In the intermediate state from the starting of the motor to the normal operation thereof, the period of time $t_4$ is gradually made shorter and accordingly, the changeover of the modes is made gradually faster and the rotational speed of the rotor 7 gradually increases. In this case, the polarity changing points E, F etc. are detected since the induced voltage is sufficiently large, and therefore, in response to detection of the polarity changing points, measurement of the period of time $t_2$ starts (see FIG. 4B). In the state of normal operation, the period of time $t_4$ is made to be 00H and the changeover of the modes is made based on the periods of time $t_1$ and $t_2$ (see FIG. 4C). Let us consider a case where the load is changed during the operation of the motor. If the load is increased to cause a delay in the rotational phase of the rotor 7 with respect to the rotation of the rotational magnetic field of the stator 4, the phase of the induced voltage is also delayed as described above and detection of the polarity changing points E, F, etc. is retarded. As a result, the periods of time $t_1$ and $t_2$ are made long and therefore, the timing for the changeover of the modes is made slow and the rotational speed of the rotational magnetic field becomes slow, which results in a decrease of a difference between the rotation of the rotor and the rotation of the rotational magnetic field. On the contrary, if the load is decreased to cause an advance of the rotation phase of the rotor 7 with respect to the rotation of the rotational magnetic field of the stator 4, detection of the polarity changing points E, F, etc. is made faster in reverse and the timing for the changeover of the modes is made at a higher speed. In this case also, the lag caused between the rotation of the rotor and the rotation of the rotational magnetic field is made small. Thus, according to the present invention, the timing for the changeover of the modes changes automatically according to the rotation position of the rotor 7 and as a result, adjustment to the changes in load can be made in an extremely smooth manner.

Control of the rotational speed of the motor in the state of normal operation can be made by control of the voltage to be applied to the stator coils. More specifically, if the voltage to be applied to the stator coils is made large, the rotational magnetic field generated in the stator becomes large, which results in increase of the torque and increase of the rotational speed of the rotor. Needless to say, according to the increase of the rotational speed of the rotor, the timing for the changeover of the modes is also made fast. On the other hand, if the voltage to be applied to the stator coils is made small, the rotational magnetic field becomes small, causing decrease of the torque and decrease of the rotational speed of the rotor. Consequently, the timing for the mode changeover is automatically made slow.

In the foregoing description, a rotation position of the rotor is detected at every 60°. However, since the rotor has inertia, it is not necessary to detect the rotation position of the rotor at every 60° unless a considerably heavy load is applied. If the control device is simplified to control the inverter 3 based on the polarity changing points porvided at every 120°, no inconvenience arises in a practical use. In addition, if the load applied to the motor is sufficiently light, the polarity changing points may be provided by 360°, that is, for one rotation of the rotor, so as to be detected in the coil of any one of the phases U, V and W, whereby control of the inverter 3 can be made based on the detected signals.

Figure 24:
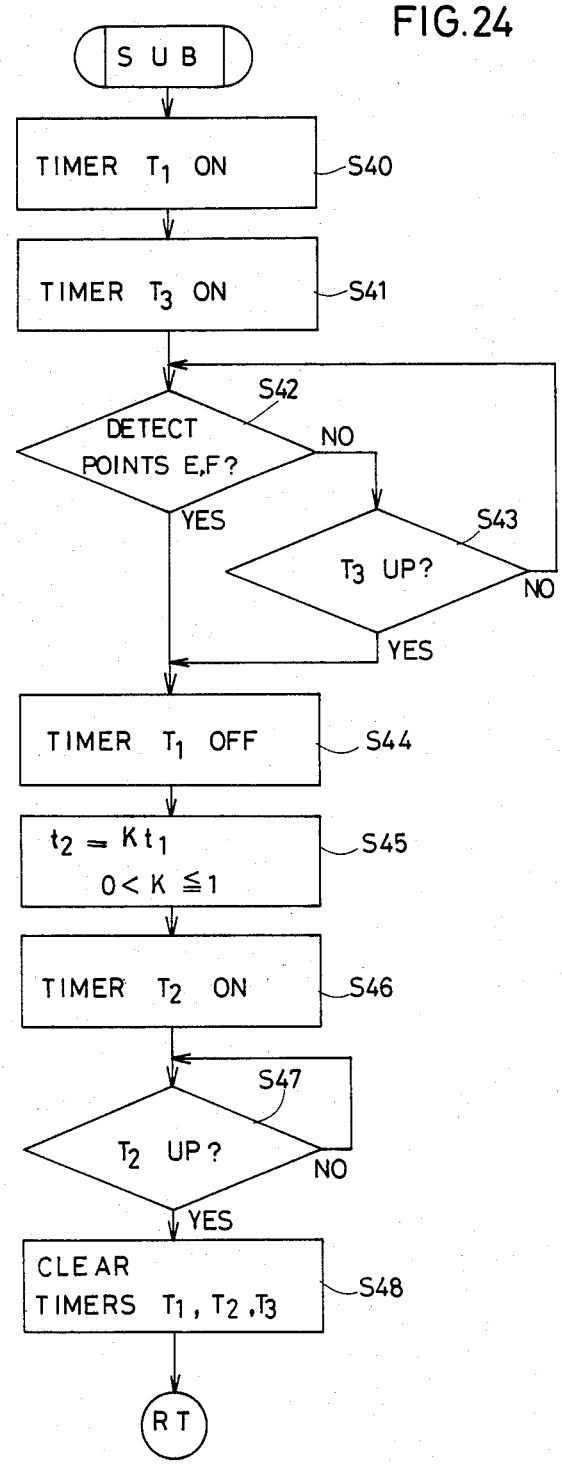
FIG. 24 is a flow chart for explaining the timer processing operation in case where the period of time $t_4$ is not provided.

The above described timer $T_4$ and period of time $t_4$ serve to start the operation of the motor more smoothly. However, such period of time $t_4$ does not need to be specially provided, since starting of the motor can be made by means of the timer $T_3$ which attains time-up after the above described period of time $t_3$. FIG. 24 is a flow chart for explaining the timer processing operation in case where the period of time $t_4$ is not provided. This flow chart is established by excluding the steps concerning the timer $T_4$ and the period of time $t_4$ from the flow chart shown in FIG. 7. Therefore, description thereof is omitted.

Figure 8:
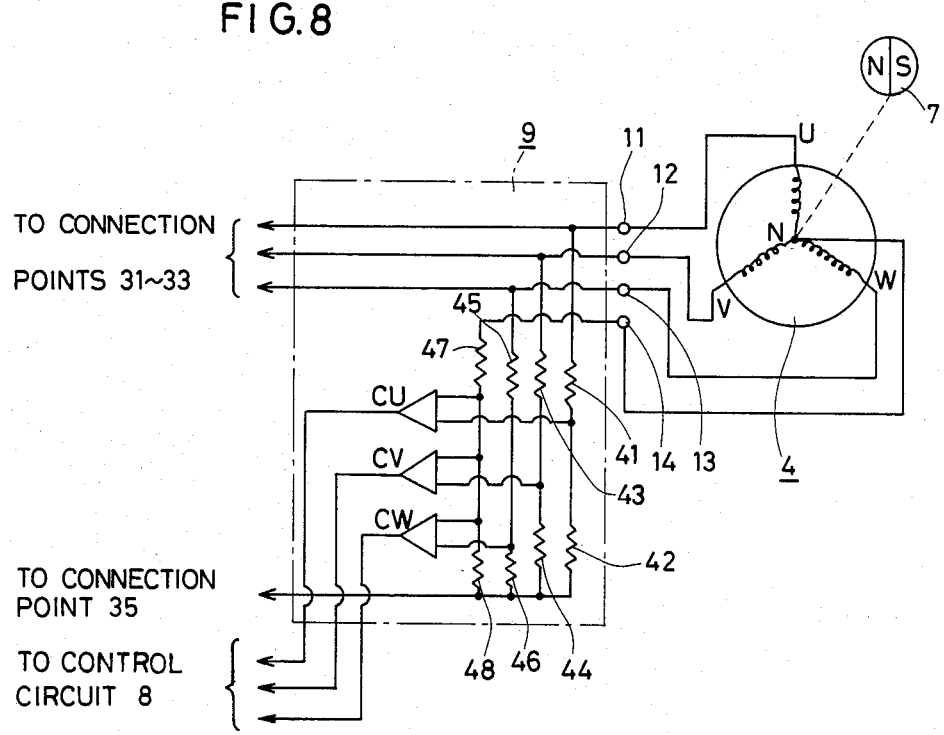
FIG. 8 is a circuit diagram showing another embodiment of the present invention.

Now, another embodiment of the present invention will be described. FIG. 8 is a circuit diagram showing another embodiment of the present invention. This embodiment differs from the embodiment in FIG. 3 only in the structure of the rotor position detecting circuit 9. Therefore, only the vicinity of the circuit 9 is shown in FIG. 8. The other portions are the same as shown in FIG. 3. In this embodiment, the comparators CU, CV and CW respectively compare the voltage at the neutral point N and the voltage at the terminals 11 to 13 in the respective stator coils. The outputs from the comparators CU, CV and CW in this embodiment are the same as in the embodiment in FIG. 3. More specifically, the outputs from the comparators CU, CV and CW are those shown in FIG. 2D.

Figure 10:
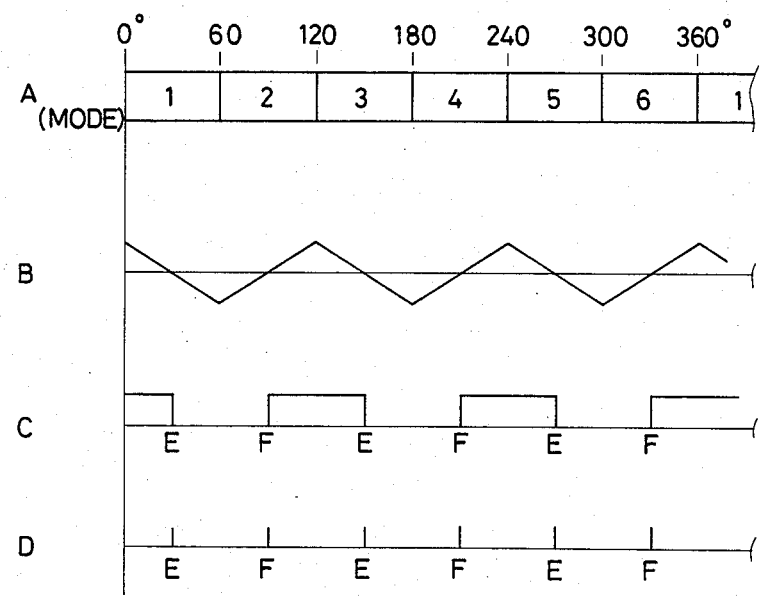
FIG. 10 shows a timing chart in the embodiment in FIG. 9.
Figure 9:
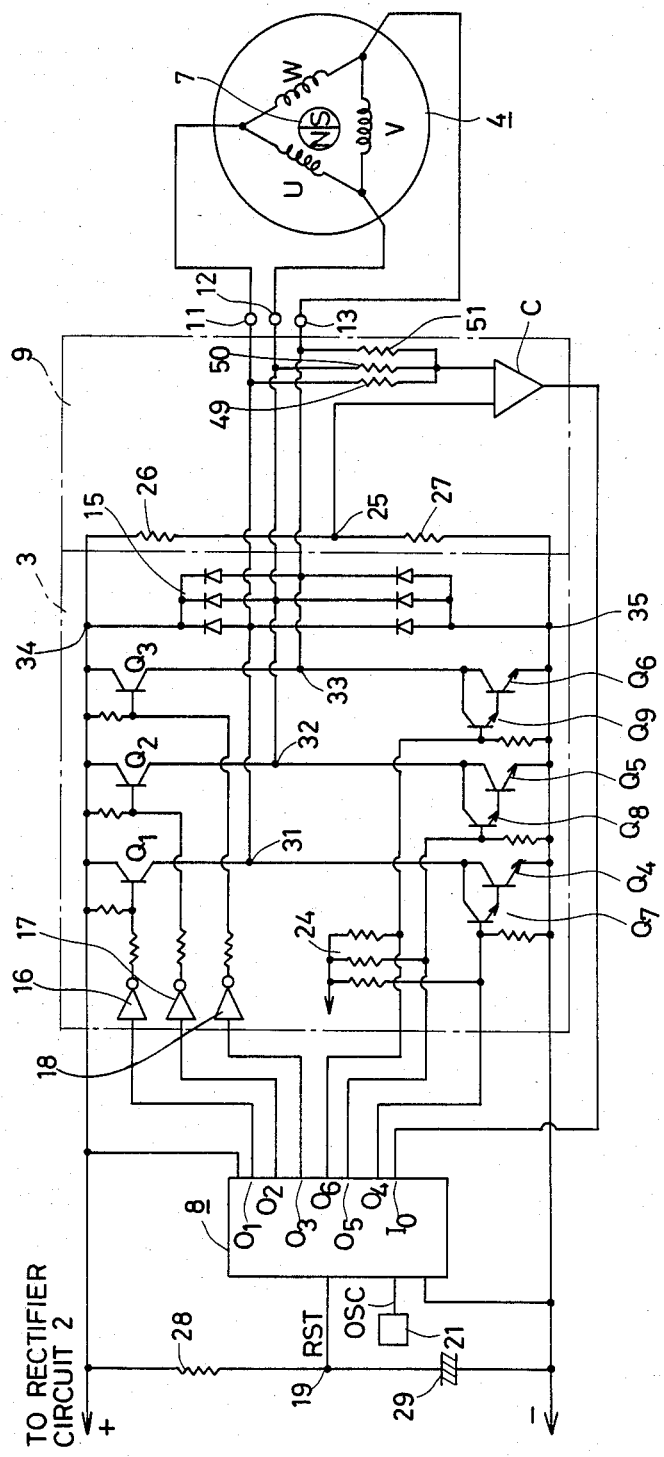
FIG. 9 is a circuit diagram showing a further embodiment of the present invention.

FIG. 9 is a circuit diagram showing a further embodiment of the present invention. In this embodiment, the rotor position detecting circuit 9 includes a comparator C. The comparator C compares a resultant voltage of the voltage induced in the terminals 11 to 13 with the neutral at the virtual neutral point 25. This rotor position detecting circuit 9 also detects the polarity changing points E, F in the same manner as in the case of FIG. 3. This will be described with reference to the drawings. FIG. 10 shows a timing chart in the FIG. 9 embodiment, where FIG. 10A shows mode numbers, FIG. 10B shows input of the comparator, FIG. 10C shows output of the comparator, and FIG. 10D shows timing at the polarity changing points. In FIG. 10B, the reference line represents neutral voltage and the curve showing a triangle wave represents typically resultant voltage of the induced voltage in the respective phases. As can be seen from FIGS. 10C and 10D, this embodiment also makes it possible to detect the polarity changing points E, F with the same timing as shown in FIG. 2E. In this embodiment, the changeover of the modes as shown in FIG. 6 is made in response to a rise or a descent of the output from the comparator C. More specifically, in the step S26 in FIG. 7, it is determined whether the polarity changing point E or F is detected or not. According to this embodiment, the rotor position detecting circuit 9 needs only one comparator and the control circuit 8 needs only one input port. Therefore, the structure of the control device can be simplified. In addition, this embodiment does not need to utilize a neutral point in the stator coils and accordingly, connection of the stator coils may be a delta connection or a star connection.

Figure 11:
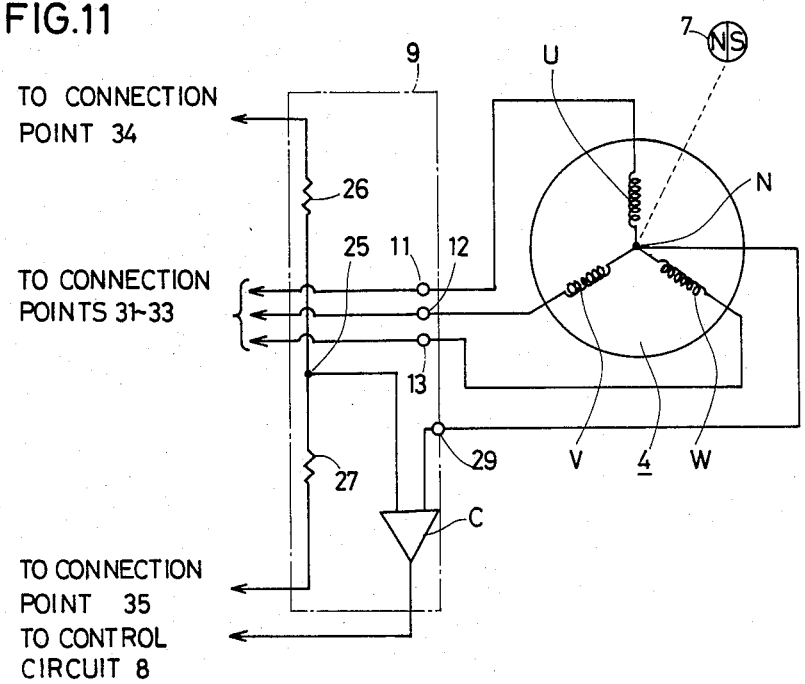
FIG. 11 is a circuit diagram showing still a further embodiment of the present invention.

FIG. 11 is a circuit diagram showing still a further embodiment of the present invention. This embodiment differs from the FIG. 9 embodiment in that one input portion of the comparator C is connected to the neutral point N of the stator coils. Therefore, only the vicinity of the rotor position detecting circuit 9 is shown in FIG. 11. The other portions are the same as in the circuit shown in FIG. 9. By the connection in this embodiment, almost the same output as shown in FIG. 10 can be obtained from the comparator C.

Although the above described embodiments were related to an example of a three-phase motor, it goes without saying that the present invention is not limited to a three-phase motor.

As described above, according to the present invention, a control device for motor having excellent characteristics can be obtained without using special rotor position detecting elements such as Hall elements in a conventional type. Since Hall elements are not used, the number of lead wires for connecting to a motor and a control device can be decreased to three at minimum. In addition, since the period for conduction to the stator coils and the timing thereof are automatically controlled according to the load applied to the rotor, a fixed number of revolutions can be maintained with small power consumption when a light load is applied. Accordingly, by a control device in accordance with the present invention, control with high efficiency can be made in a simple structure. Moreover, since the above described value K can be easily changed by modifying the program, follow-up can be made easily according to the change in the purposes for which a motor is to be used.

In the following, an example of the structure of a brushless motor to which the above described control device is applied will be described. First, description will be made of a motor characterized by the insulation of a stator core. Conventionally, insulating means between a stator core and stator coils or transition leads has a structure in which plural sheets of insulating paper are inserted into slots of the core one by one, and assembling of the insulating means needs to be made manually and takes a lot of time. Since such insulating paper is simply inserted into the slot, it sometimes happens that the insulating paper falls out of the slot. Another insulating means has a structure in which a synthetic resin having excellent properties in insulation and heat resistance and absorbing little moisture is used as an insulating material instead of insulating paper as described above, molding is made with such insulating material interposed between a yoke or the like and stator coils or leads so as to maintain a necessary insulating distance between them. In such insulating means, insulation between the core and the stator coils is assured, but insulation and protection of the leads for connecting the respective stator coils can not be sufficiently assured. In addition, recently, the size of a motor has become small, and for such a small-sized motor, sufficient insulation and protection of the leads cannot be made without using many protection tubes. Accordingly, in case where transition leads are long and a large number of connections are needed, the withdrawing process and the connecting process of the transition leads become complicated and at the same time, protection of the leads causes difficulty in miniaturizing a motor.

Figure 12:
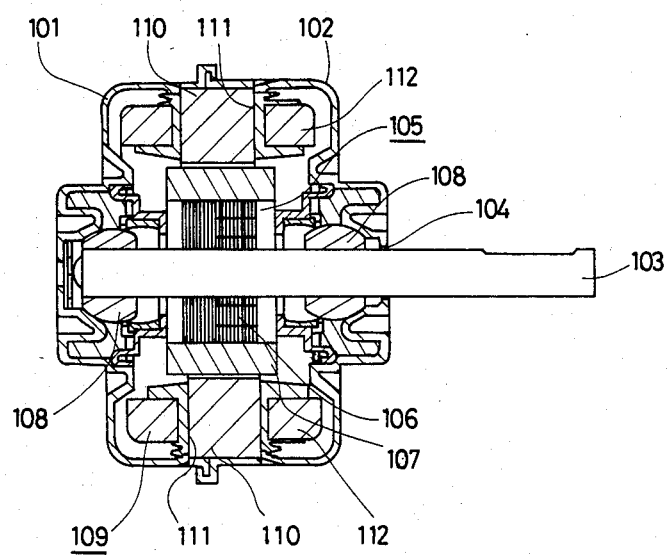
FIG. 12 is a sectional view showing an example of a brushless motor to which a control device in accordance with the present invention is applied.

Therefore, the following description will be made of a motor in which special means such as protection tubes need not be provided as protecting means for transition leads or wires and withdrawing processing of the transition leads can be made easily and in addition, the size can be made smaller than a conventional type. FIG. 12 is a sectional view showing an example of a brushless motor to which a control device in accordance with the present invention is applied. Brackets 101 and 102 are formed by drawing process using metallic molds. The bracket 102 has a penetrating hole 104 into which a rotating shaft 103 penetrates. A rotor 105 comprises a rotating shaft 103, a rotor core 106 laminated with plates made of silicon steel plates or electrical sheets, and a permanent magnet 107 of ferrite material fixed around the rotor core 106. The rotating shaft 103 is supported rotatably by a bearing metal 108 of a self-aligning structure. A stator 109 comprises a stator core 110, a synthetic resin material 111 and stator coils 112 and so on.

Figure 13:
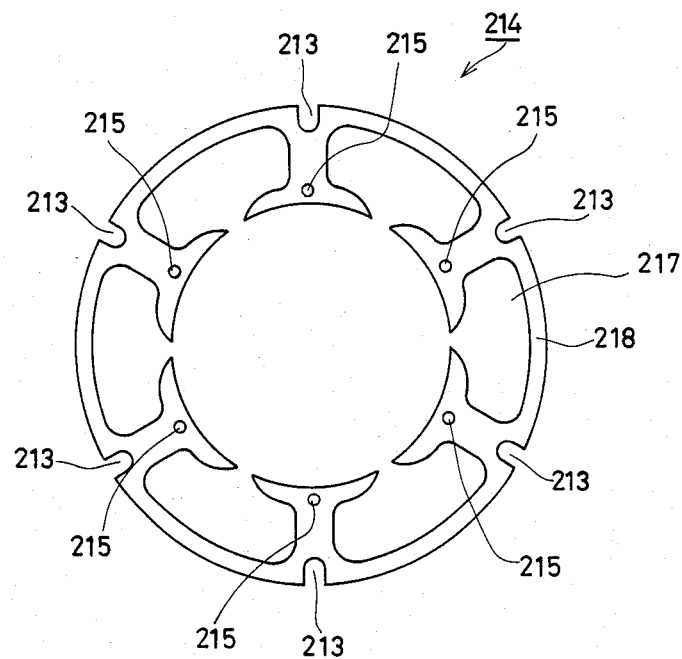
FIG. 13 is a top view of an iron plate for use in a stator of the motor shown in FIG. 12.

FIG. 13 is a top view of a core to be used in the stator of the motor shown in FIG. 12. An iron plate 214 to be used in the stator is made of a silicon steel plate or electrical sheet and the like and is provided with notches 213 on the outer circumference of the yoke 218 so as not to interfere with a magnetic path. A plurality of such plates 214 are stacked by using caulking portions 215 so as to align the notches 213 continuously, whereby the stator core 110 is formed.

Figure 14:
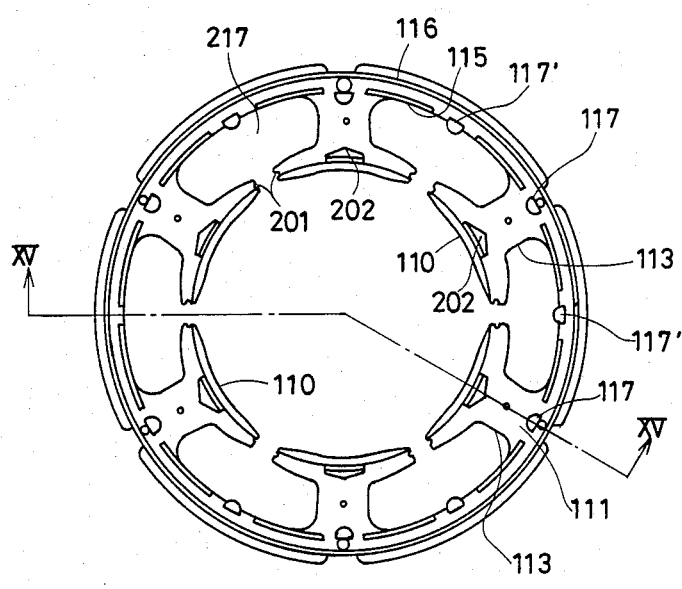
FIG. 14 is a top view of the stator for the motor in FIG. 12 before stator coils are wound.
Figure 15:
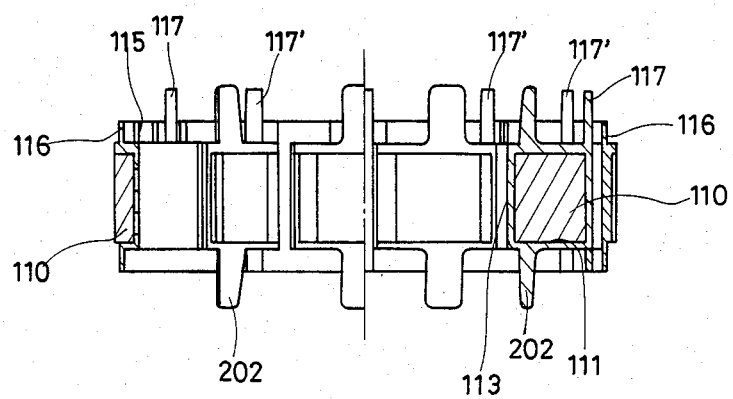
FIG. 15 is a sectional view taken along the line XV—XV in FIG. 14.
Figure 16:
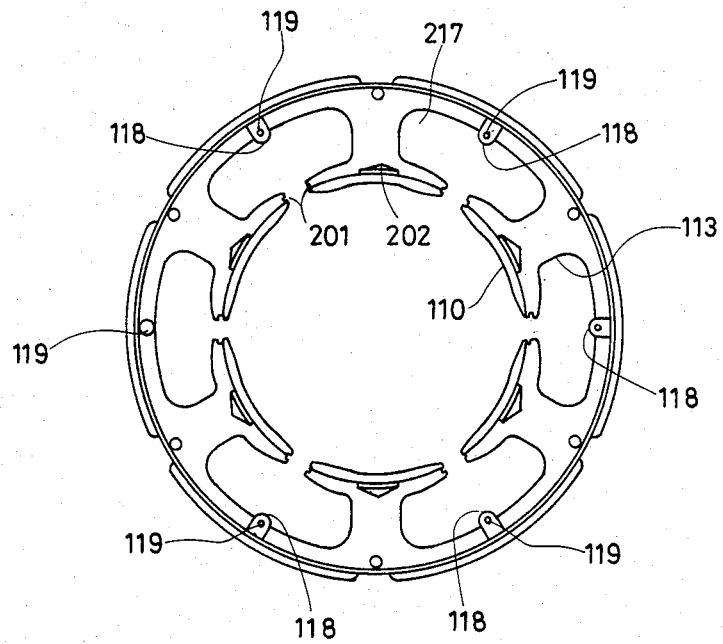
FIG. 16 is a bottom view of the stator for the motor in FIG. 12 before stator coils are wound.
Figure 17:
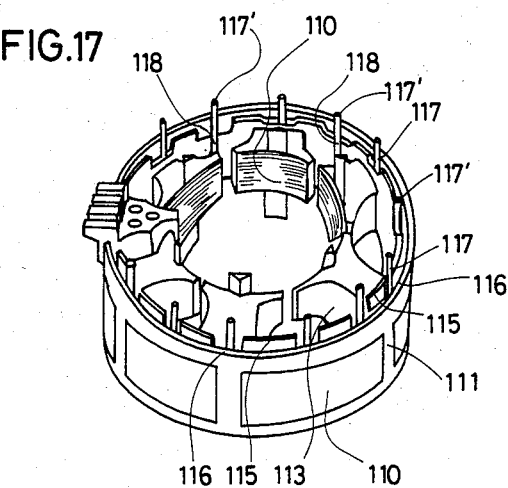
FIG. 17 is a perspective view of the stator for the motor in FIG. 12 before stator coils are wound.
Figure 18:
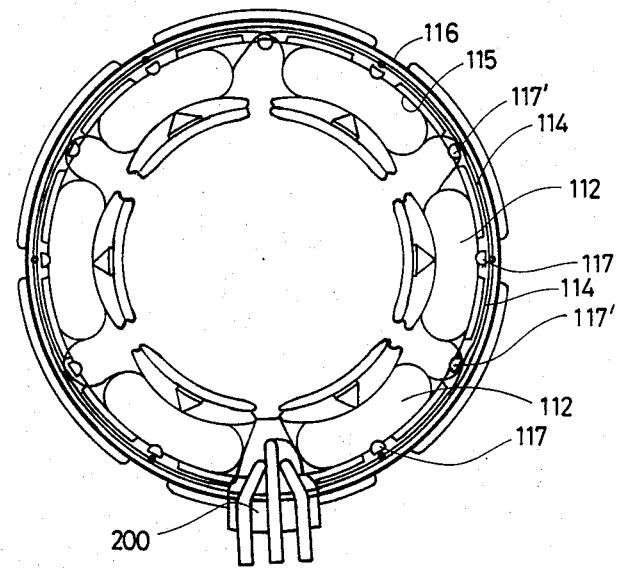
FIG. 18 is a top view of the stator for the motor in FIG. 12 after stator coils are wound.
Figure 19:
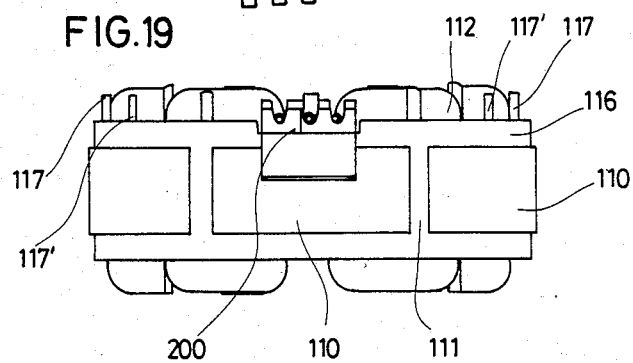
FIG. 19 is a side view of the stator for the motor in FIG. 12 after stator coils are wound.

Insulation of the stator etc. will be described hereinafter with reference to FIGS. 14 to 19. FIG. 14 is a top view of the stator in the FIG. 12 motor before the stator coils are wound thereto. FIG. 15 is a sectional view taken along the line XV—XV in FIG. 14. FIG. 16 is a bottom view of the stator in the FIG. 12 motor before the stator coils are wound thereto. FIG. 17 is a perspective view of the stator in the FIG. 12 motor before the stator coils are wound thereto. FIG. 18 is a top view of the stator in the FIG. 12 motor after the stator coils are wound thereto. FIG. 19 is a side view of the stator in the FIG. 12 motor after the stator coils are wound. As can be seen from the above stated drawings, in the vicinity of a slot portion 217, a portion 113 for insulation between the core 110 and the stator coils 112, protection walls 115 and 116 provided on the yoke 218 of the core 110 for introducing transition leads 114 connecting the stator coils 112, and guide bars 117 and 117' for withdrawing the transition leads 114 from the protection walls 115 and 116 are formed by injection of synthetic resin. The guide bars 117 and 117' are respectively in the shape of a semicircular column. Each guide bar 117' provided in contact with the slot portion 217 has a convex portion 118 extending like a rib along the inner wall of the slot. These convex portions 118 are turned to the bottom surface of the stator 109 as shown in FIG. 16. As a result, even if synthetic resin is injected only from the upper surface of the stator 109, the synthetic resin runs well so that a sufficient amount of synthetic resin is supplied to the bottom surface of the stator 109. The reference character 119 indicates traces of the vent holes provided in the mold. In the insulating portion 113, supporting rods 202 for the stator coils 112 are formed integrally with it by injection of synthetic resin in the same manner. Grooves shown in FIG. 14 etc. serve to insert wedges in case where insertion of wedges is required because of an increase in the number of turns of the stator coils 112.

Between the core 110 thus structured and the stator coils 112, a sufficient insulating distance is assured by an injection molde of synthetic resin. In addition, the stator coils 112 are stably supported by the supporting rods 202 and accordingly, if the stator coils 112 are not shaped by binding threads and the like, the stator coils 112 can be fixed in predetermined positions. On the other hand, since the transition leads 114 pass between the protection walls 115 and 116, insulation between the transition leads 114 and the core 110 and protection of the transition leads 114 can be made adequately without providing protecting means such as protection tubes. Operations for withdrawings the transition leads 114 from between the protection walls 115 and 116 or entering the transition leads 114 therebetween can be made easily by hanging the transition leads 114 on the guide bars 117 and 117'. The positions for withdrawing the transition leads 114 are fixed to the positions of the guide bars 117 and 117', which serves to prevent irregularities in the positions of the transition leads 114. Furthermore, interconnection of the wires can be made inside the retaining cylinder 203, which makes it unnecessary to provide any special protecting means for insulation of the connecting portions. The above described transition leads 114 are connected to the external withdrawing lines through a connector 200 as shown in FIG. 18 etc.

Th notches 213 in the iron plate 214 in the above described example are not limited to the above described form. Such notches may be provided in any form as far as cylinders or grooves for passing conductor wires can be formed with multiple layers of plates 214.

In the above described motor, a necessary insulation distance between the stator coils and the core can be easily assured only by a molding thickness of the synthetic resin and fixing or withdrawing operations of the transition leads can be made easily by utilizing the guide bars. As a result, the assembling process of the motor can be simplified. In addition, since the guide bars can be integrally molded by the synthetic resin in the form of ribbed convex portions extending along the inner walls of the slots, the synthetic resin runs well along these convex portions at the time of injecting the synthetic resin from one end of the stator, so that uniform molding of the synthetic resin can be made and defectiveness in the molding of the stator can be prevented.

Finally, a motor characterized by the cooling of a rotor will be described. Generally, in a small-sized motor of the inner rotor type, particularly a brushless motor having a permanent magnet in a rotor, it is necessary to maintain the magnetic flux density of a rotor higher than a predetermined value. For that purpose, the magnetic flux density is maintained higher than a predetermined value by using a magnetic material having a large magnetic flux density and also the magnetic flux density is made uniform by using a core made of silicon steel plates or electrical sheets. Moreover, in order to miniaturize a motor of such type, it is necessary to reduce the distances between the respective components such as a stator core, rotor coils, a rotor and the like. As a result, heat generated mainly by the stator coils moves to the rotor, which causes a decrease in the magnetic flux density of the rotor, resulting in a decrease in the efficiency of the motor. If a ferrite material is used as a magnetic material, the temperature coefficient of the magnetic flux density of the ferrite material is generally as follows:

$$\Delta Br/Br/°C = -0.19\%/°C$$

where Br is the magnetic flux density. Accordingly, if the temperature of the rotor is increased to approximately 50° C., for example, due to the heating in the stator coils etc. during the operation of the motor, the following equation is established:

$$Br(50) = Br(1 - 0.0019 \times 50) = Br \times 0.905$$

As a result, the magnetic flux is decreased by approximately 10% and the efficiency and characteristics of the motor are considerably deteriorated. On the other hand, a cooling fan may be provided in the rotor in order to prevent the temperature increase in the rotor, but such method makes it difficult to miniaturize the motor. Then, a motor in which temperature increase in a rotor can be prevented by using a devised method for cooling a rotor without causing any obstruction to miniaturization of a motor will be described in the following. In this case, a motor has the same structure as shown in FIG. 12 except for a rotor and therefore, only the rotor will be described hereinafter.

Figure 20:
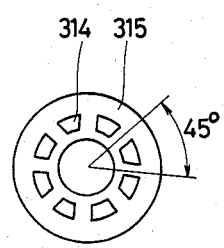
FIG. 20 is a top view of a rotor iron plate for use in a rotor.
Figure 21:
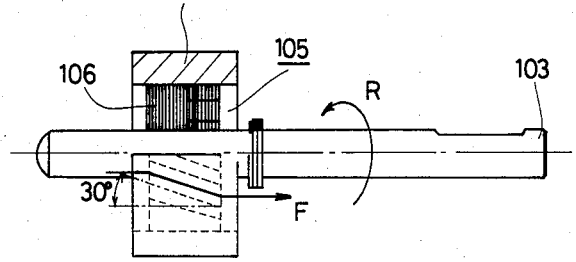
FIG. 21 is a partial sectional view of the rotor.
Figure 22:
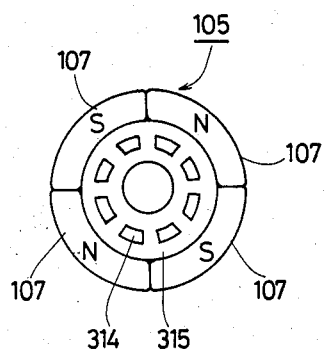
FIG. 22 is a front view of the rotor.
Figure 23:
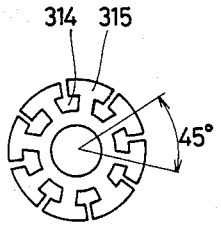
FIG. 23 is a top view of a rotor iron plate of other type for use in the rotor.

FIG. 20 is a top view of an iron plate to be used in a rotor; FIG. 21 is a partial sectional view of the rotor; FIG. 22 is a front view of the rotor; and FIG. 23 is a top view of an iron plate of other type to be used in the rotor. A rotor 105 comprises a core 106 and a permanent magnetic 107 fixed to the outer circumference of the core by an adhesive agent. The permanent magnet 107 has for example four poles. The core 106 is formed by a laminated structure of multiple layers of iron plates 315 in which air holes 314 are provided coaxially at the intervals of 45° so as to form a skew, as shown in FIG. 20. The skew amount is approximately 30° to the left in the drawings. The air holes 314 may be continuous radially toward the outer circumference of the iron plate 315 as shown in FIG. 23, causing no change in the characteristics.

Referring to FIG. 21, in case where the rotor rotates in the direction shown by the arrow R, air is inhaled from the left side of the core 106 into the core due to the skew of the air holes 314 and is exhaled to the right side, as shown by the arrow F. In case where the rotor rotates in the opposite direction, air flows reversely. The shapes of the air holes are not limited to those indicated in the drawings and the skew amount of the core is also not limited to the above described amount.

In the above described motor, rotation of the rotor causes air circulation in the brackets due to the skew of the rotor with respect to the rotor as a center even if the motor is miniaturized, and as a result, cooling of the rotor core and the magnetic material can be made. Accordingly, in particular, temperature increase in the magnetic material can be prevented, and also decrease in the efficiency of the motor can be avoided. Simultaneously, cooling of the stator coils can be made, and thus, safety and a long lifetime of the motor can be assured. Although air holes are provided in the rotor core, the magnetic flux density of the core can be maintained almost uniform, so that lowering of the magnetic flux density can be prevented, since iron plates are stacked so as to form a skew. If stacking of iron plates is made by providing revet holes or caulking holes and the like, the magnetic flux density can be maintained more uniform.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device for controlling conduction to stator coils in a brushless motor having stator coils of a plurality of phases and a rotor having a permanent magnet of a plurality of poles, said control device comprising:

power source means for supplying direct current power, inverter means responsive to a control signal applied thereto for supplying said direct current power to said stator coils in a plurality of predetermined modes to be changed over so as to generate a rotational magnetic field in said stator coils, reference voltage providing means for providing reference voltage having a predetermined relation with voltage of said power source means, comparing means for comparing voltage induced in said stator coils due to rotation of said rotor with said reference voltage so as to provide a comparison signal, and mode controlling means for supplying said control signal corresponding to said predetermined modes for said inverter means, said mode controlling means including:

first timer means responsive to changeover of said modes to be enabled and responsive to change in said comparison signal to be disabled for determining a first period of time, and second timer means responsive to disablement of said first timer means to be enabled for changing over said modes at the end of a second period of time having a predetermined relation with said first period of time.

2. A control device in accordance with claim 1, wherein said control device further comprises third timer means responsive to the changeover of said modes to be enabled for determining a third period of time, and said first timer means is disabled responsive to either the change in said comparison signal or the end of said third period of time which comes earlier.

3. A control device in accordance with claim 1, wherein said predetermined relation between said first period of time and said second period of time is the following:

$$0 < t_2 \leq t_1$$

where $t_1$ indicates said first period of time and $t_2$ indicates said second period of time.

4. A control device in accordance with claim 3, wherein said reference voltage providing means includes voltage divider means having a neutral point for dividing the voltage of said power source means, said reference voltage is the voltage of said neutral point, and said comparing means compares said induced voltage in the connection points of said stator coils and said inverter means with the voltage of said neutral point.

5. A control device in accordance with claim 4, wherein said brushless motor has a stator with six teeth, said stator coils are stator coils of three phases wound on said six teeth, the number of said connection points is three, and said mode controlling means controls six kinds of modes so that said direct current power is supplied to said stator coils of three phases respectively with a phase difference of 120°.

6. A control device in accordance with claim 5, wherein said comparing means includes a voltage comparator which compares resultant voltage of said induced voltage in said three connection points with the voltage of said neutral points.

7. A control device in accordance with claim 5, wherein said comparing means includes three voltage comparators each of which compares respectively said induced voltage at each of said three connection points with the voltage of said neutral point.

8. A control device in accordance with claim 5, wherein said inverter means includes a plurality of semiconductor switching elements with control electrodes connected in a three-phase bridge fashion.

* * * * *